United States Patent [19]

Auinger

[11] 4,451,751
[45] May 29, 1984

[54] THREE-PHASE WINDING FOR A HIGH-VOLTAGE MACHINE

[75] Inventor: Herbert Auinger, Nuremberg, Fed. Rep. of Germany

[73] Assignee: Siemens Aktiengesellschaft, Munich, Fed. Rep. of Germany

[21] Appl. No.: 423,077

[22] Filed: Sep. 24, 1982

[30] Foreign Application Priority Data

Oct. 16, 1981 [DE] Fed. Rep. of Germany ....... 3141239

[51] Int. Cl.³ .............................................. H02K 3/00
[52] U.S. Cl. .................................. 310/184; 310/198; 318/773
[58] Field of Search ............................. 310/198–208, 310/180, 184; 318/773

[56] References Cited

U.S. PATENT DOCUMENTS

| | | | |
|---|---|---|---|
| 3,432,707 | 3/1969 | Peters | 310/208 |
| 3,673,477 | 6/1972 | Broadway | 318/773 |
| 3,809,937 | 5/1974 | Koike | 310/205 |
| 3,953,753 | 4/1976 | Barrett | 310/202 |
| 4,132,914 | 1/1979 | Khutoretsky | 310/205 |
| 4,138,615 | 2/1979 | Broadway | 310/198 |
| 4,341,970 | 7/1982 | Auinger | 310/184 |

FOREIGN PATENT DOCUMENTS 2841415 10/1980 Fed. Rep. of Germany ...... 310/184

*Primary Examiner*—R. Skudy
*Attorney, Agent, or Firm*—Kenyon & Kenyon

[57] ABSTRACT

A three-phase winding for numbers of poles 2p=4 comprises "with" and "counter" coil groups which are arranged asymmetrically and connected in series in such a way that there is no change of the maximum voltage present at the phase transitions, where this maximum voltage is determined for numbers of pole pairs 2p=6 by the sum of the absolute values of the adjacent potentials $|U_1|+|U_2|=(3p-1) U_{SG}$ with a corresponding minimum value of $U_{1,2}=(p-1) U_{SG}$ where $U_{SG}$ is the coil group voltage. The six winding ends (U, V, and W; X, Y and Z) are arranged physically side-by-side within a pole pair, and, in general, at most only four or six wiring connections need to be installed, only at two short respective circumference zones side-by-side.

9 Claims, 14 Drawing Figures

THREE-PHASE WINDING FOR A HIGH-VOLTAGE MACHINE

BACKGROUND OF THE INVENTION

This invention relates to three-phase windings for a high voltage machines in general and more particularly to a three-phase winding in which the maximum voltage at phase transitions is reduced.

A three-phase winding for a high voltage machine with any number of poles $2p \geq 4$ and Y connected legs, the coil groups of which, alternatingly connected in opposite directions, are connected in the same and the opposite sense with respect to the magnetization and potential direction, and the "with" and "counter" coil groups so formed are distributed along the circumference and connected in series in such a manner that a reduction of the maximum voltages present between adjacent coil sides at the phase transitions is obtained, is described in U.S. Pat. No. 4,341,970. For symmetrical arrangements of the "with" and "counter" coil groups in the individual legs described therein, relatively long wiring connections frequently result, the number of which increase with increasing numbers of poles, so that, especially in the case of machines with higher numbers of poles, many wiring connections must be installed side-by-side with correspondingly many crossings. This is particularly undesirable. Displacing the Y point from the leg ends or terminals, U, V and W to the leg ends or terminals X, Y and Z results, in such a symmetrical design, in no change of the potential differences at the phase transitions, since the potentials $|U_1|$ and $|U_2|$ are merely interchanged.

If all coil groups are connected in series, the voltage of one coil group is $U_{SG}=(\frac{1}{2}p)U_{ph}(U_{ph}=U_n/\sqrt{3}$ with $U_{ph}$=phase voltage, $U_N$=line voltage). The sum of the absolute values of the adjacent potentials at the phase transitions is $|U_1|+|U_2|=2p\ U_{SG}$ in the known winding. Since the adjacent potentials $U_1$ and $U_2$ are electrically shifted 120°, the actual voltage stress is obtained by vectorial addition of both adjacent potentials in accordance with:

$$\Delta U = U_N \sqrt{(U_1 + \tfrac{1}{2} \cdot U_2)^2 + (\tfrac{1}{2}U_2\sqrt{3})^2} \cdot 1/(2p\sqrt{3})$$

so that with $|U_1|+|U_2|$=const, the highest voltage occurs if one of the two potential $U_1$ and $U_2$ has its maximum value.

By partially abandoning the principle of order $|U_1|+|U_2|=2p\times U_{SG}$=const, by an asymmetrical arrangement, wiring connections which are easier to install may be obtained under some circumstances for windings with a larger number of poles according to the references in U.S. Pat. No. 4,341,970. If one takes a further step and allows maximum voltages at the phase transitions which are about 10 to 15% higher than in the symmetrical design, at most five coil group wiring connections placed side-by-side will be sufficient in such an asymmetrically arranged three-phase winding for the frequently occurring number of poles $2p<10$, as practice has shown.

When "reversing the Y," i.e., interchanging the terminals U, V and W for the terminals X, Y and Z of a three-phase winding with "with" and "counter" coil groups designed in this manner, on the other hand, high voltages similar to those in the conventionally designed three-phase windings with coil groups constructed identically throughout, in which the direction of the potential change in all coil groups has either the same or the opposite direction of magnetization, result. In such conventional three-phase windings for high voltage machines, the maximum voltage present turns out to be, if the coil groups are connected in series, at a phase transition in the vicinity of the leads which are brought out, due to the high adjacent potentials, $U_1=2p\ U_{SG}=U_{ph}$ at the beginning of a leg, and $U_2=(2p-1)U_{SG}$ in the adjacent second coil group of the other leg. The voltage difference increases with increasing number of poles from a minimum of 0.88 $U_N$ (for $2p=4$) to nearly the line voltage $U_N$ according to the Table.

In these known conventional three-phase windings, at most only wiring connections for four coil groups disposed side-by-side are required. The sum of the absolute values of the adjacent potentials at the mentioned worst point is $|U_1|+|U_2|=(4p-1)U_{SG}$.

It is an object of the present invention to provide a three-phase winding of the kind mentioned at the outset which requires a number of wiring connections to be installed side-by-side on the coil head side only slightly larger than in the normal design and which results, upon "Y reversal" of the leg ends, in no increased maximum voltage at the phase transitions. Further, at the same time, the level of this maximum voltage can also be substantially higher than in the known symmetrical design according to U.S. Pat. No. 4,341,970, but distinctly lower than that of the conventional standard design.

SUMMARY OF THE INVENTION

A general solution of the stated problem is possible for any number of poles $2p \geq 4$ with an asymmetrically distributed arrangement and series connection of the individual coil groups of the three winding legs along the circumference such that upon reversal of the Y connections, i.e., upon interchanging the terminals (U, V, and W with X, Y and Z), the maximum voltages present at the phase transitions remain unchanged, the six winding ends (U, V and W and X, Y and Z) being arranged physically side-by-side within a pole pair, the sums of the absolute values of the adjacent potential being at most $|U_1|+|U_2|=(3p-2)U_{SG}$ at the phase transistions which occur if the respective 2p coil groups of a leg are connected in series, where $U_{SG}$ means the voltage of a coil group, and generally four and up to six wiring connections are installed side-by-side only over individual short sections of the circumference, to connect the individual coil groups on the coil head side.

A special solution of the problem for pole numbers $2p=4$ is characterized by the feature that the "with" and "counter" coil groups are designed and connected so that at the phase transitions with the highest voltage stress the sum of the absolute values of the adjacent potentials $|U_1|+|U_2|=5\ U_{SG}$ for a respective smallest potential value $U_{1,2\ min.}=2\ U_{SG}$ and at most four wiring connections are installed side-by-side in the coil head.

In three-phase winding according to the present invention respective 2p coil groups of the winding legs may follow each other directly with respect to their potential sequence in one winding leg along the circumference and the two other leg may be composed in a quasi mirror-symmetrical arrangement to each other with respect to a central winding section which has p coil groups side-by-side and which is followed on the one side by a second winding section running through in the opposite direction consisting of (p−1) coil groups, where the one winding leg begins with the individual coil groups, and the other with the winding section consisting of (p−1) coil groups. At most only four coil group wiring connections placed side-by-side are required for pole number 2p=4, as in the known windings, and from 2p=6 on, at most six such wiring connections are required at two points of the circumference which, however, need to be led past each other only over the circumference range of a coil group.

From $2p \geq 6$ on, the sums of the absolute values of the adjacent potentials obtainable with this connection are at most $|U_1| + |U_2| = (3p-2)U_{SG}$ at the phase change. This maximum sum of potentials is obtained regardless of whether the Y point is frmed at the terminals U, V and W or X, Y and Z, overall at (p+1) points of the circumference. As already explained, the maximum of the voltage stress occurs, due to the vectorial addition of the adjacent potentials $U_1$ and $U_2$, at those phase transitions at which one of the potentials has its minimum which therwith is the case, $|U_{1,2}|\min = (p=-1)U_{SG}$ at two respective points of the circumference.

According to the mentioned relationships, this maximum voltage increases slightly with increasing number of poles. For the most frequently occurring applications up to 2p<10, however, it is, with $\leq 0.64 U_N$, only about 10% higher than in the symmetrical design according to U.S. Pat. No. 4,347,970; for 2p=16, it is, with approximately 0.70 $U_N$, still about 30% lower than the voltage occurring in the standard design (see Table).

In a four-pole winding according to the present invention with at most four coil group wiring connections placed side-by-side in the coil head, approximately 0.63 $U_N$ occurs as the highest voltage at the phase change. Through another connection variant which has three crossings with five wiring connections, the maximum voltage can also be limited, as in the symmetrical design, to the value of the phase voltage. A six-pole three-phase winding can also be constructed, with unchanged maximum voltages at the phase change, with at most only five wiring connections between the coil groups instead of six.

In the Table, the maximum number of the wiring connections to be installed side-by-side of the series connected coil groups for a three-phase winding A with a coil group arrangement and connection according to the present invention and for a winding B with symmetrical arrangement according to U.S. Pat. No. 4,341,970 and for a conventional three-phase winding C are given as a function of the number of poles 2p. The maximum voltages at the phase transition relative to the line voltage and the maximum sums $|U_1| + |U_2|$ of the absolute values as well as the corresponding minimum values $|U_1|_{min.}$ and $|U_2|_{min.}$ of the adjacent potentials are further juxtaposed as a multiple of the coil group voltage $U_{SG}$ for the mentioned windings A, B and C.

DETAILED DESCRIPTION

Figure 1:
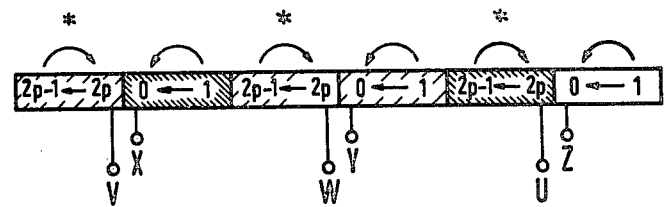
FIGS. 1 to 3 show examples for the physically adjacent arrangement of the six winding terminals within the circumferential range of a coil pair.

In the drawing the assignment to the three legs is shown unhatched, hatched or closely hatched, respectively.

In FIGS. 5 to 13, besides the magnetization directions ( or ) respectively) changing from coil group to coil group, the respective potential values as a multiple of the coil group voltage $U_{SG}$ and the potential breakdown directions (→ or ←) respectively) are also shown. The "counter" coil groups are marked with *. At the points designated with wavy lines, the largest number of wiring connections between the coil groups lying side-by-side or crossing each other occurs. The bold vertical arrows mark the phase transitions with the maximum voltage $\Delta U_{max.}$, and the thin vertical arrows indicate the points with the same sum of absolute values $|U_1| + |U_2|$ but with slightly lower voltage stress. Besides the potential distribution if the Y point is formed at the leg ends X, Y and Z, the complementary potential distribution for reversal to the leg ends U, V, and W is also given.

Figure 2:
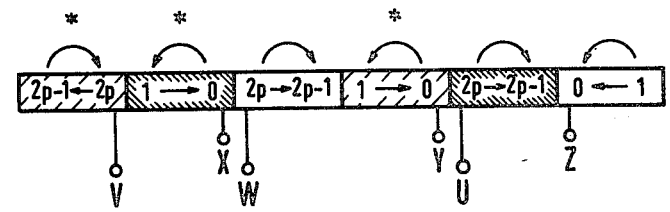
Figure 3:
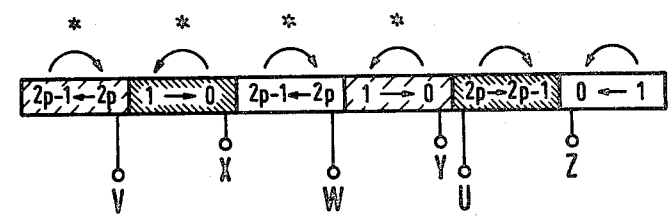
Figure 10:
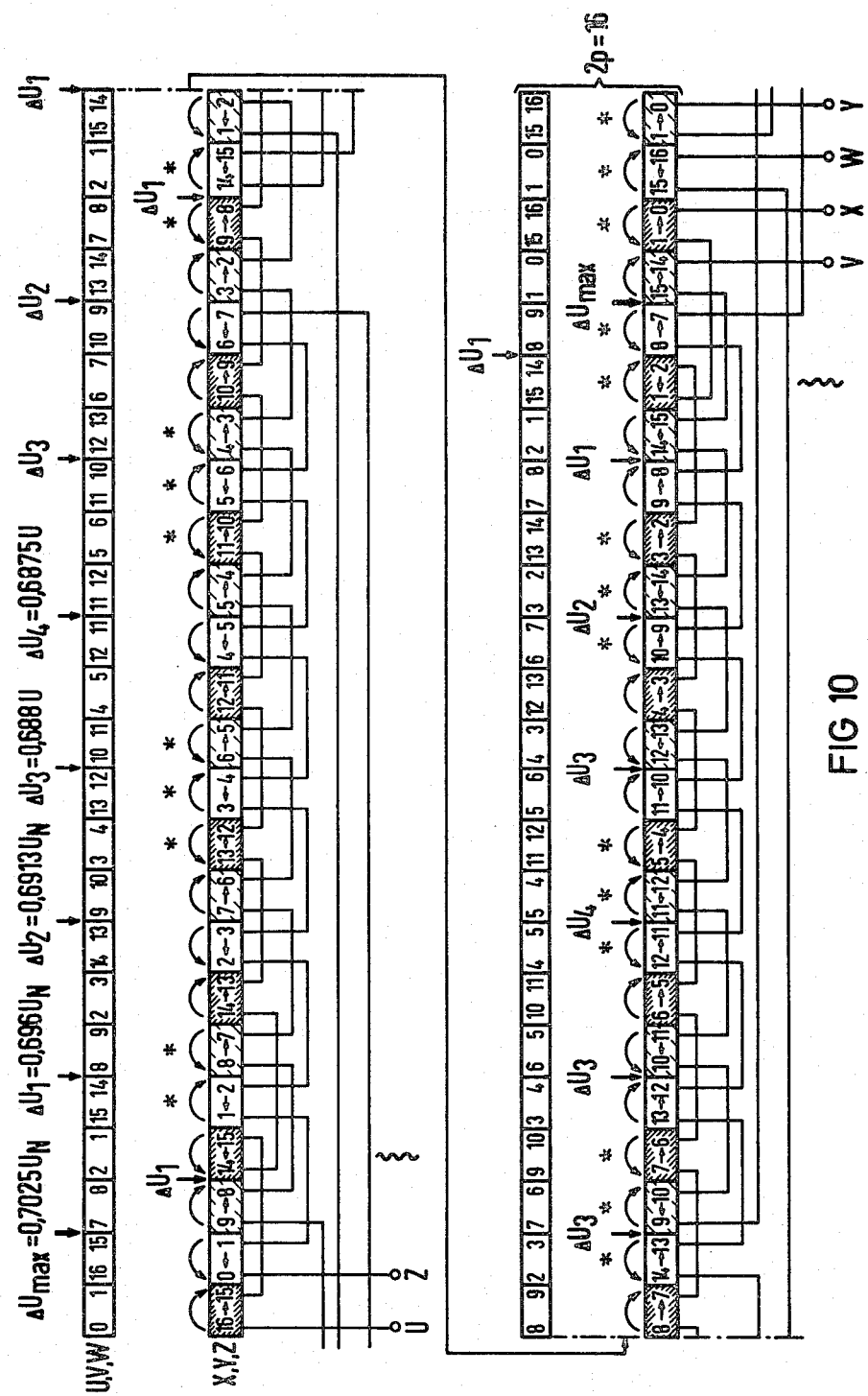
Figure 11:
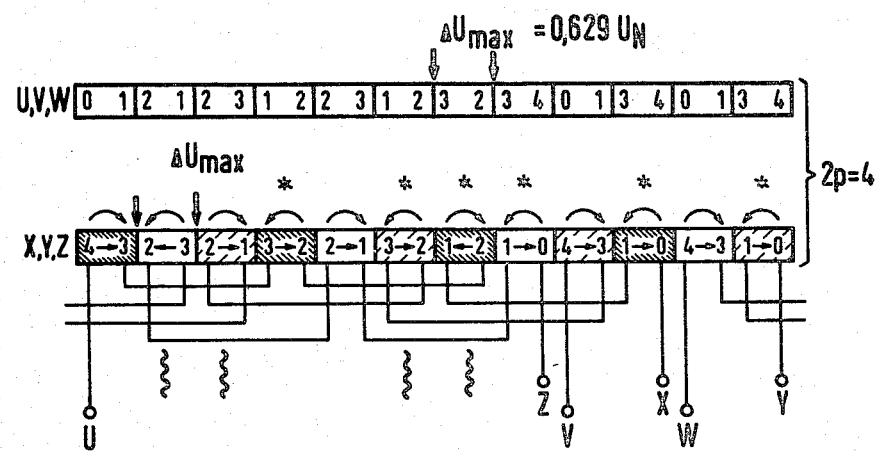
FIGS. 11 and 12 show two differently connected design variants of a four pole three-phase winding.
Figure 12:
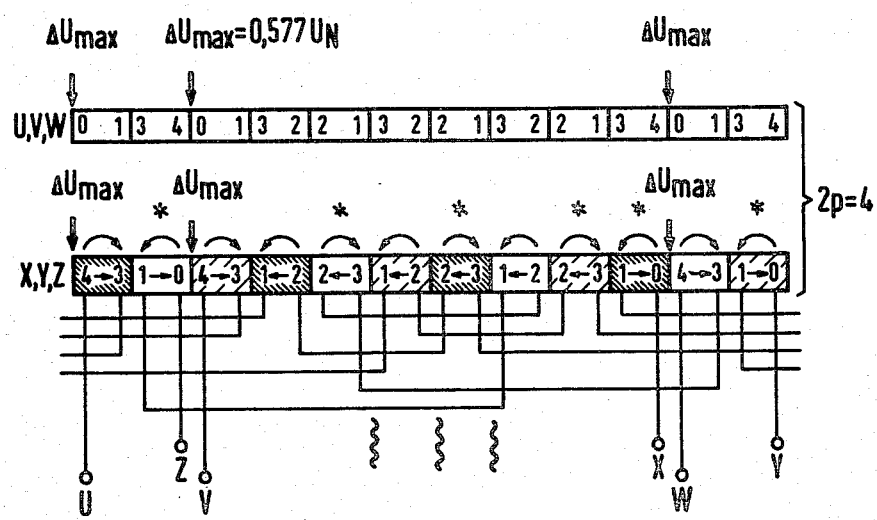

In the three-phase winding according to the present invention, all six winding ends are characteristically arranged physically side-by-side within a pole pair such as is indicated in FIGS. 1 to 3. In the arrangement according to FIG. 1, an "output" terminal (X, Y and Z), is immediately adjacent to each "input" terminal (U, V, and W), and the sum of the absolute values of the adjacent potentials at the phase transitions in this area is constant and amounts to $U_1 + U_2 = 2p\ U_{SG}$. Such an arrangement is provided particularly for the smaller numbers of pole pairs, as is shown in FIGS. 10, 11 and 12 for 4 pole windings and the FIGS. 6 and 13 for 6 pole windings, in order to avoid increased voltage stresses in the vicinity of the lead ends. For larger numbers of poles, the arrangements may also be chosen which are designed according to FIGS. 2 and 3 or similar one, in which only two or only one "input" and "output" terminal are immediately adjacent and the sums of the absolute values of the adjacent potentials at the phase transitions located at this pole pair vary between $(2p-1)U_{SG}$ and $(2p+1)U_{SG}$. See examples in FIGS. 7 to 10.

Figure 4:
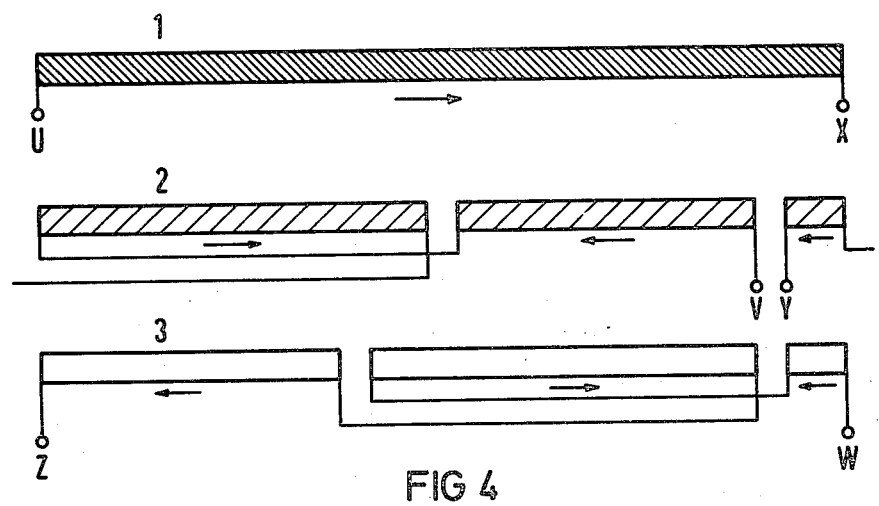
FIG. 4 is a structured schematic showing the order of the coil groups within the different legs along the circumference according to one embodiment of the present invention.

As was already mentioned in the list of Figures, the 4 pole to 16 pole three-phase windings according to FIGS. 5 to 10 are constructed in accordance with the same universally usable structured schematic shown in FIG. 4.

The first leg U-X is followed by all 2p coil groups (in the circumferential direction) in order from left to right. The two other legs are constructed with manual quasi-mirror symmetry and consist of a central winding section which has p adjacent coil groups and which is followed on the one side by a second winding section which runs through in the direction opposite thereto, consisting of (p−1) coil groups, and, on the other side, by a single coil group. The second leg therefore begins with its "input" terminal V at the winding section which runs through from right to left and comprises (p−1) coil groups, and ends with the "output" terminal Y at the single coil group, while the third leg begins with W at the single coil and ends with Z at the winding section with (p−1) coil groups likewise running through from right to left. For putting the mentioned winding sections together, two long wiring connections which extend over one-half the circumference of the machine are required for the legs V-Y and W-Z.

Figure 5:
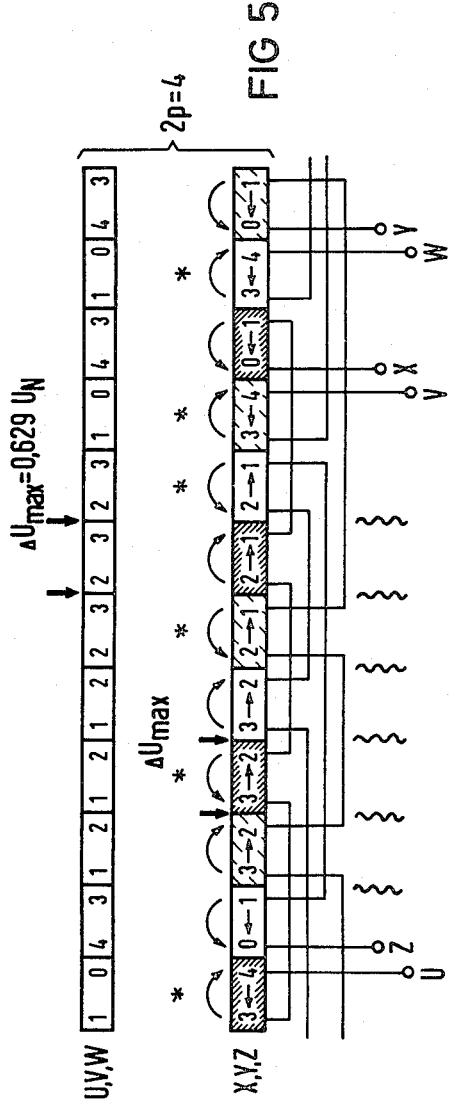
FIGS. 5 to 10 show the complete zone plans with magnetization directions and potential distributions for both Y connections as well as all wiring connections for 4 to 16 pole three-phase windins, the legs of which are structured according to FIG. 4.

As is shown in detail in the examples of FIGS. 5 to 10, the individual coil groups are designed and connected within this sequence as "with" and "counter" coils in such a manner that the maximum sums of the absolute values of the adjacent potentials occurring at the phase transitions are, for the 4 pole winding according to FIG. 5, $|U_1|+|U_2|=(|3|+|2|)U_{SG}=5U_{SG}$ and for the windings with 6 or more poles, $|U_1|+|U_2|=(3p-2)U_{SG}$. The latter always occur at the total number of (p+1) points of the circumference marked with vertical arrows; the highest voltage stress $\Delta U_{max}$ is obtained at the two phase transitions marked by bold arrows, at which one of the two adjacent potentials has its minimum value $U_{1,2\ min.}=(p-1)U_{SG}$. The corresponding voltages are always given in the Figures.

At coil group wiring connections to be installed side-by-side, at most a total of six crossings with four connections each (according to FIG. 5) are obtained in the windings for 2p=4 constructed according to the structure schematic, of FIG. 4. For all other numbers of poles $2p \geq 6$, at most six wiring connections are required at two points of the circumference, which, however, are to be led only over the circumferential range of one coil group and always come to lie at the points marked with wavy lines at the second-next coil groups to the left and right beside the pole pair having the terminal points.

In the 4 pole winding according to FIG. 11, the individual coil groups follow each other directly in all three legs along the circumference, so that overall, shorter connection lengths are obtained, with an unchanged number of wiring connections to be installed side-by-side. With respect to the maximum voltage stress there are no differences from FIG. 5.

According to FIG. 12, the individual coil groups can also be designed and put together with respect to their potential sequence in such a manner that the same sums of the absolute values of the adjacent potentials of $|U_1|+|U_2|=4U_{SG}$ occur. The maximum voltage occurring is therefore limited, as in the symmetrical design according to U.S. Pat. No. 4,341,970, to the value of the phase voltage which occurs at the three points of the adjacent potentials, $(4+0)U_{SG}$. In the wiring connections, crossings with five wiring connections must be allowed in the circumferential zone opposite the terminal ends, in the case of three adjacent phase transitions.

Figure 6:
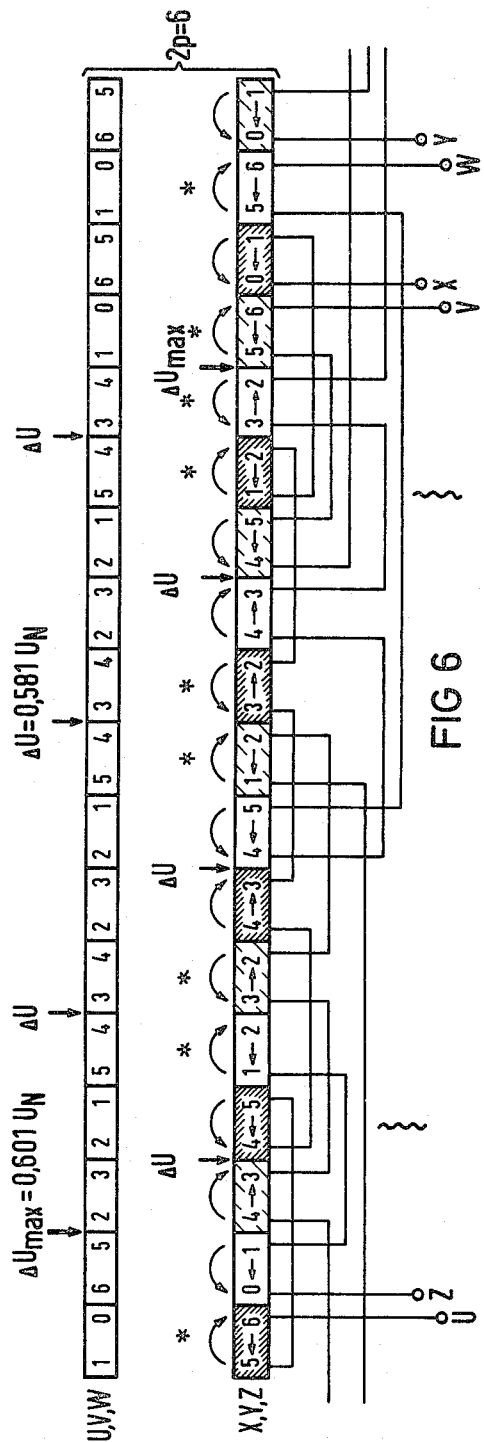
Figure 7:
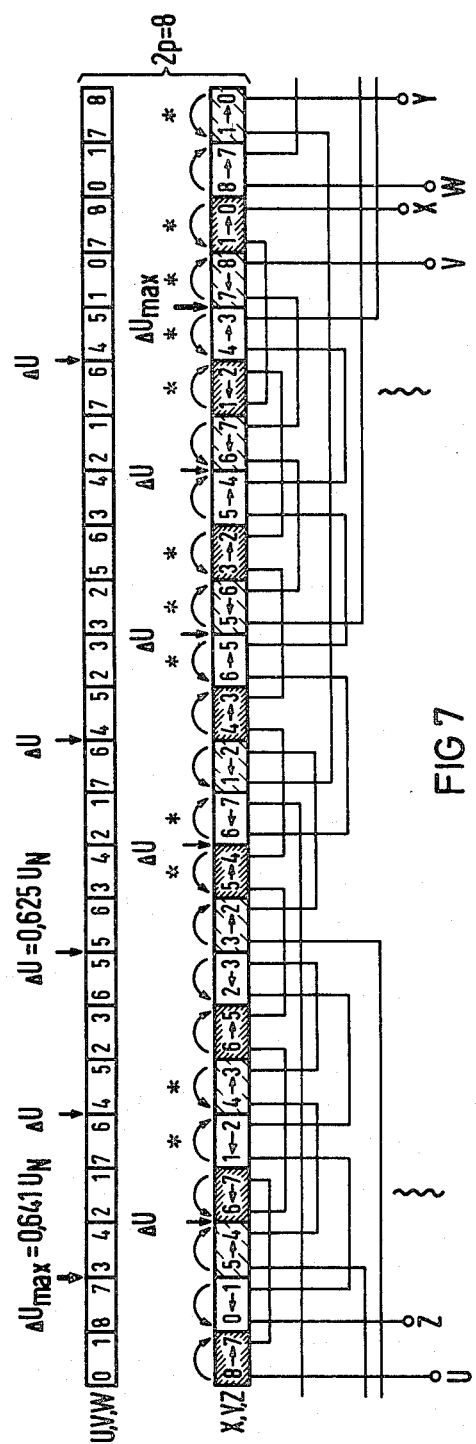
Figure 8:
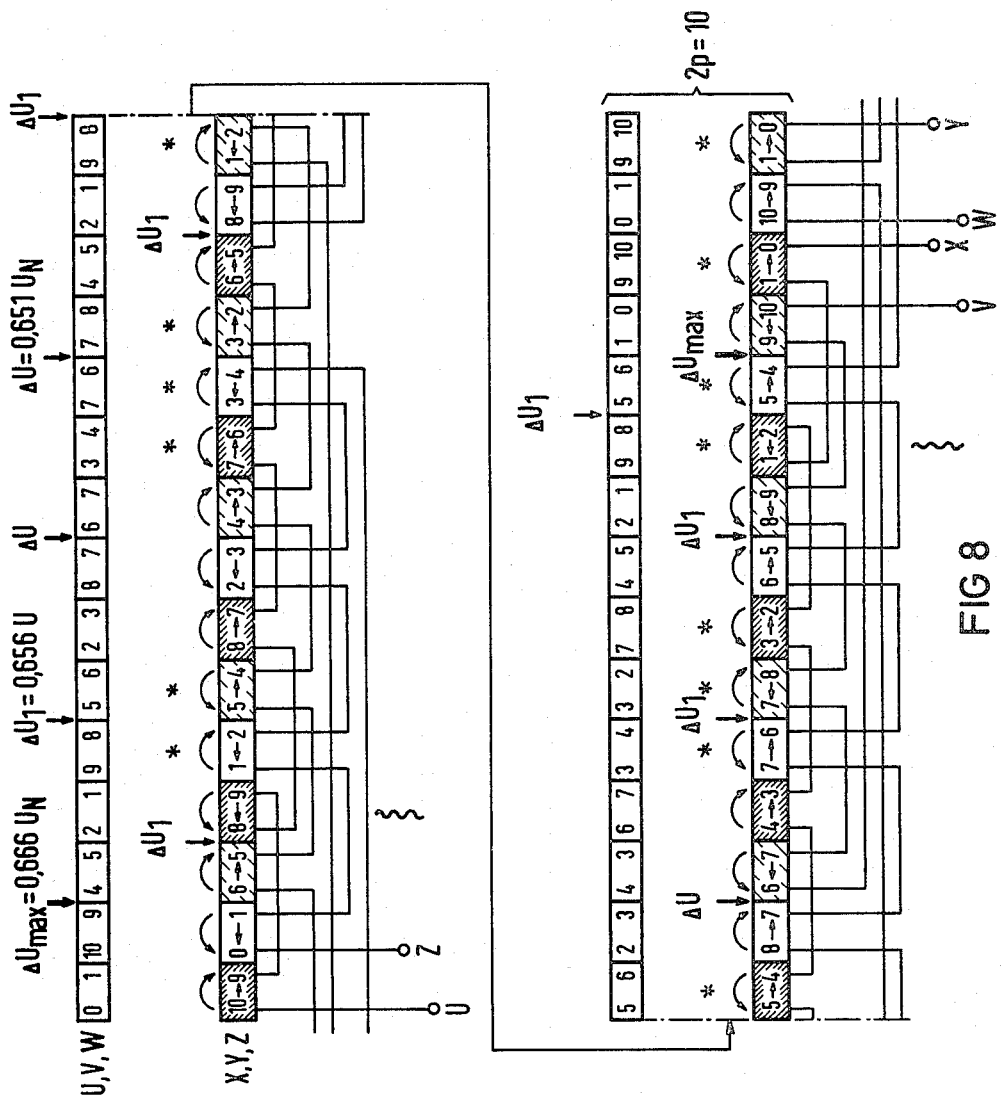
Figure 9:
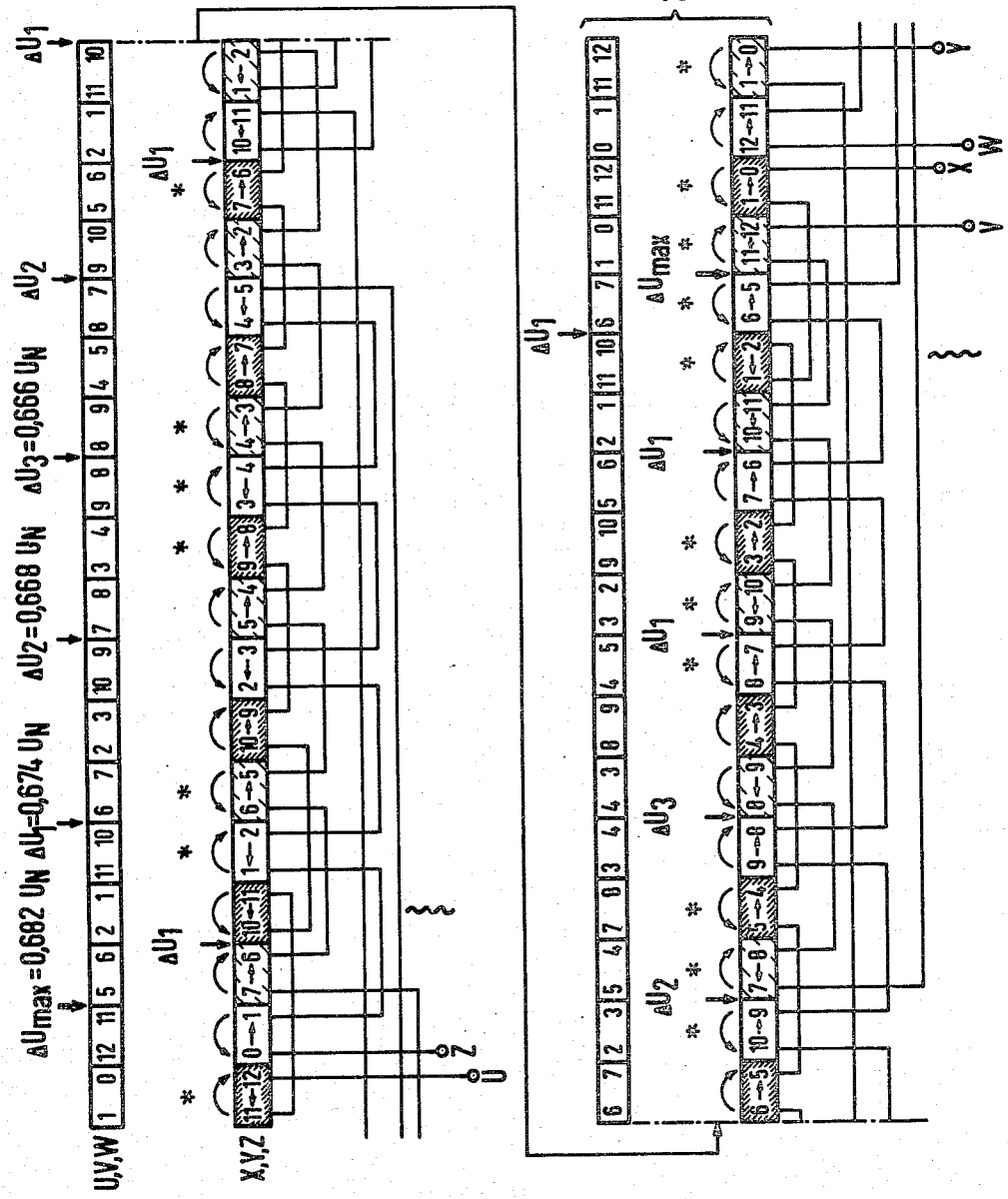
Figure 13:
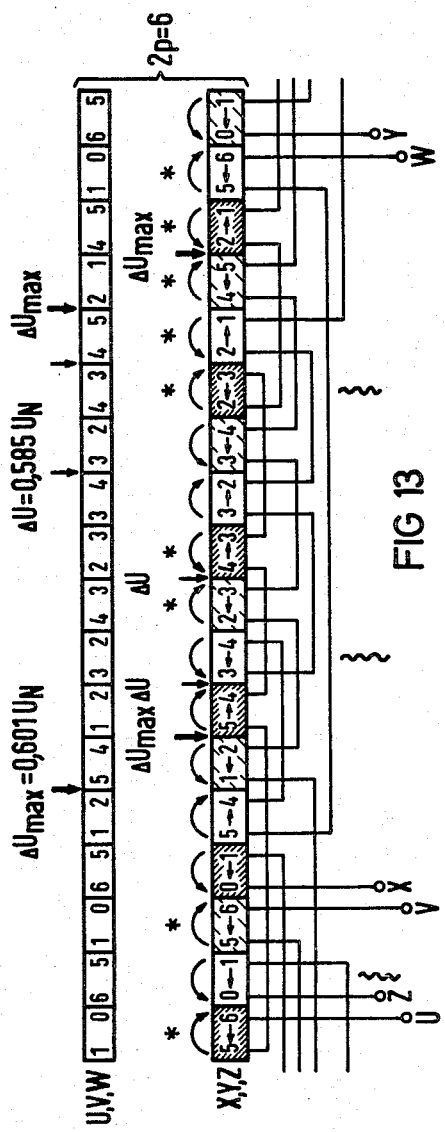
FIG. 13 shows a design variant of a six pole three-phase winding with fewer wiring connections.

The variant of a 6 pole three-phase winding shown in FIG. 13 requires at most five wiring connections to be installed side-by-side on the coil head side, as compared to FIG. 6; however, at three points of the circumference. The maximum voltage stress remains unchanged with $\Delta U_{max}=0.601\ U_N$.

Figure 14:
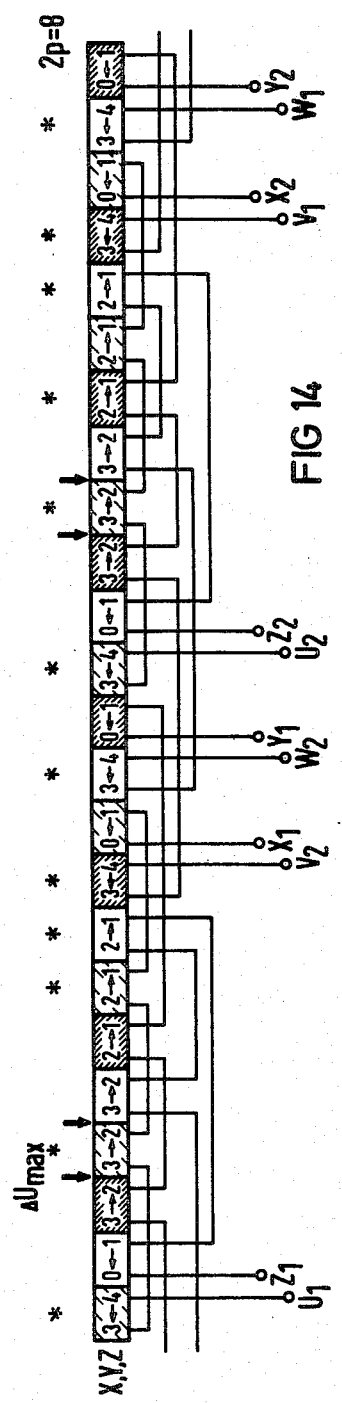
FIG. 14 illustrate an eight pole three-phase winding with two partial branches per leg.

Besides the series connection of the respective 2p coil groups of each leg, on which all examples were based so far, modifications of the present invention are possible in an analogous manner particularly for windings with more poles and two, three or more parallel branches. Thus, starting from the examples shown, windings for twice the number of poles with two parallel branches can be formed by putting two identical winding arrangements together, as is indicated in FIG. 14 for an eight pole winding which consists of two subsystems put together at suitable points from a potential standpoint and put together in nested fashion. Depending on the number and spatial distribution of the individual winding branches, longer wiring connections with a possibly increased number of crossings may have to be tolerated, among other things, in the case of parallel connections.

As a further embodiment variant, modifications can be also realized which do not always use an equal subdivision in to "with" and "counter" coil groups. In such cases, the number of the "counter" coil groups provided is larger or smaller than that of the "with" coil groups. Thus, all those coil groups which participate neither in the feeding at U, V, and W nor, after the Y point reversal in the formation of the maximum sum of the absolute values $|U_1|+|U_2|=(3p-2)U_{SG}$, can basically be designed in any desired manner, which is the case, for instance, in the 16 pole winding according to FIG. 6 in the four central coil groups located in the vicinity of the terminals as well as with the coil groups with the potential steps 8-7, 7-6, 4-3 and 3-2 for the first leg (U-X). Instead of designing the mentioned eight coil groups according to FIG. 10 with equal numbers of "with" and "counter" coils, they could all have also been designed identically or divided up differently as desired.

| number of poles 2p | maximum number of the wiring connections installed side by side for winding design | | | maximum voltage stress at the phase transition | | | | | | $|U_{1,2}|_{min}$ at the phase transition as a multiple of $U_{SG}$ for winding design | | | FIG. |
| | | | | $U_{max}/U_N$ for winding design | | | $|U_1|+|U_2|$ as a multiple of $U_{SG}$ for winding design | | | | | | |
| | A | B | C | A | B | C | A | B | C | A | B | C | |
| 4 | 4(5) | 5 | 4 | 0.629 (0.577) | 0.577 | 0.878 | 5(4) | 4 | 7 | 2(0) | 0 | 3 | 5, 11, 12 |
| 6 | 6(5) | 6 | 4 | 0.601 | 0.577 | 0.918 | 7 | 6 | 11 | 2 | 0 | 5 | 6, 12 |
| 8 | 6 | 8 | 4 | 0.641 | 0.577 | 0.938 | 10 | 8 | 15 | 3 | 0 | 7 | 7 |
| 10 | 6 | 9 | 4 | 0.666 | 0.577 | 0.950 | 13 | 10 | 19 | 4 | 0 | 9 | 8 |
| 12 | 6 | 11 | 4 | 0.682 | 0.557 | 0.959 | 16 | 12 | 23 | 5 | 0 | 11 | 9 |
| 14 | 6 | 12 | 4 | 0.964 | 0.557 | 0.965 | 19 | 14 | 27 | 6 | 0 | 13 | — |
| 16 | 6 | 14 | 4 | 0.702 | 0.557 | 0.969 | 22 | 16 | 31 | 7 | 0 | 15 | 10 |

Winding design A: present invention
Winding design B: according to U.S. Pat. No. 4,341,970
Winding design C: convention three-phase winding

What is claimed is:

1. In a three-phase winding for a high voltage machine with any number of poles 2p=4 and Y connected legs, formed of coil groups, each leg having two winding ends to provide a total of six winding ends, with the coil groups alternatingly connected in opposite directions, and connected in the same and the opposite sense with respect to the magnetization and potential direction to form "with" and "counter" coil groups which are distributed along the circumference and connected in series in such a manner that a reduction of the maximum voltages present between adjacent coil sides at the phase transitions is obtained, the improvement comprising an asymmetrically distributed arrangement and series connection of the individual coil groups of the three winding legs along the circumference such that upon reversal of the Y connections, the maximum voltages present at the phase transitions remain unchanged, the six winding ends being arranged physically side-by-side within a pole pair, the sums of the absolute values of the adjacent potential being at most $|U_1|+|U_2|=(3p-2)U_{SG}$ at the phase transitions which occur when the respective 2p coil groups of a leg are connected in series, where $U_{SG}$ is the voltage of a coil group, whereby generally four and up to six wiring connections are installed side-by-side only over individual short sections of the circumference, to connect the individual coil groups on the coil head side.

2. The improvement according to claim 1, for the number of poles 2p=6, wherein the "with" and "counter" coil groups are designed and connected in such a way that, at the phase transitions with the highest voltage stress, the respective smallest potential values are $U_{1,2\ min.}=(p=1)U_{SG}$.

3. The improvement according to claim 2, for the number of poles 2p=6, wherein at most five wiring connections are installed side-by-side.

4. The improvement according to claim 1, for the number of pole 2p=4, wherein the "with" and "counter" coil groups are designed and connected in such a way that the sum of the absolute values of the adjacent potentials is $|U_1|+|U_2|=4\ U_{SG}$ at the phase transition with the highest voltage stress, with a respective smallest potential value $U_{1,2\ min.}=0$, and at most five wiring connections are installed side-by-side in the coil head.

5. The improvement according to claim 1, wherein the sum of the absolute values of the adjacent potentials is contact at the phase transitions in the vicinity of the winding ends brought out and is $|U_1|+|U_2|=2p\ U_{SG}$.

6. The improvement according to claim 1, wherein the phase transitions in the vicinity of the winding ends brought out have different sums of absolute values $|U_1|+|U_2|$ in the range of $(2p-1)U_{SG}$ to $(2p+1)U_{SG}$.

7. The improvement according to claim 1, with parallel winding branches, wherein a coil group arrangement constructed according to the design criteria for half the number of poles is repeated at least two times in the direction of the circumference.

8. In a three-phase winding for a high voltage machine with a number of poles 2p=4 and Y connected legs, the coil groups of which, alternatingly connected in opposite directions, are connected with respect to the magnetization and potential direction in the same and opposite sense, to form "with" and "counter" coil groups which are distributed along the circumference and connected in series in such a way that a reduction of the maximum voltages present at the phase transition between adjacent coil sides is achieved, the improved comprising the "with" and "counter" coil groups being designed and connected so that, at the phase transitions with the highest voltage stress, the sum of the absolute values of the adjacent potentials is $U_1+U_2=5\ U_{SG}$, where $U_{SG}$ is the voltage of a coil group, and the respective smallest potential value is $U_{1,2\ min.}=2\ U_{SG}$ and at most four wiring connections are installed side-by-side in the coil head.

9. The improvement according to claim 1 or 8, wherein the respective 2p coil groups of the winding legs follow each other directly with respect to their potential sequence in one winding leg along the circumference and the two other legs are composed in a quasi mirror-symmetrical arrangement to each other about a central winding section which has p coil groups side-by-side and which is followed on the one side by a second winding section running through in the opposite direction consisting of (p—1) coil groups, where the one winding leg begins with the individual coil groups, and the other with the winding section consisting of (p—1) coil groups.

* * * * *